United States Patent
You et al.

(10) Patent No.: US 10,638,470 B2
(45) Date of Patent: Apr. 28, 2020

(54) DOWNLINK CHANNEL RECEPTION METHOD AND USER EQUIPMENT, AND DOWNLINK CHANNEL TRANSMISSION METHOD AND BASE STATION

(71) Applicant: LG ELECTRONICS INC., Seoul (KR)

(72) Inventors: Hyangsun You, Seoul (KR); Yunjung Yi, Seoul (KR); Eunsun Kim, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/061,326

(22) PCT Filed: Dec. 9, 2016

(86) PCT No.: PCT/KR2016/014459
§ 371 (c)(1),
(2) Date: Jun. 11, 2018

(87) PCT Pub. No.: WO2017/099526
PCT Pub. Date: Jun. 15, 2017

(65) Prior Publication Data
US 2019/0045487 A1 Feb. 7, 2019

Related U.S. Application Data

(60) Provisional application No. 62/266,001, filed on Dec. 11, 2015, provisional application No. 62/278,431, filed on Jan. 13, 2016.

(51) Int. Cl.
*H04W 72/04* (2009.01)
*H04L 5/00* (2006.01)
(Continued)

(52) U.S. Cl.
CPC ........ *H04W 72/042* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

| 2012/0281646 A1 | 11/2012 | Liao et al. |
| 2013/0182664 A1* | 7/2013 | Chen .................. H04W 72/042 370/329 |

(Continued)

FOREIGN PATENT DOCUMENTS

KR 1020140131933 11/2014

OTHER PUBLICATIONS

PCT International Application No. PCT/KR2016/014459, Written Opinion of the International Searching Authority dated Mar. 15, 2017, 14 pages.
(Continued)

*Primary Examiner* — Saba Tsegaye
(74) *Attorney, Agent, or Firm* — Lee, Hong, Degerman, Kang & Waimey

(57) ABSTRACT

According to the present invention, a downlink control channel can be transmitted in varied numbers of OFDM symbols. The downlink control channel can be transmitted in a first number of OFDM symbols or can be transmitted in a second number of OFDM symbols. A user equipment can monitor a first downlink control channel candidate that spans the first number of OFDM symbols and can monitor a second downlink control channel candidate that spans the second number of OFDM symbols in a transmission time interval (TTI) for the reception of the downlink control channel. The downlink control channel can be transmitted
(Continued)

by means of one or more control channel elements (CCE), each CCE comprising resources in the same OFDM symbol.

16 Claims, 17 Drawing Sheets

(51) Int. Cl.
  *H04L 27/26* (2006.01)
  *H04W 88/02* (2009.01)
(52) U.S. Cl.
  CPC .......... *H04L 5/0053* (2013.01); *H04L 5/0078* (2013.01); *H04L 27/2602* (2013.01); *H04W 72/0446* (2013.01); *H04W 88/02* (2013.01)

(56) References Cited

U.S. PATENT DOCUMENTS

| | | | | |
|---|---|---|---|---|
| 2013/0223402 | A1* | 8/2013 | Feng | H04L 5/0007 370/330 |
| 2015/0043496 | A1 | 2/2015 | Kim et al. | |
| 2018/0152269 | A1* | 5/2018 | Xiong | H04W 72/048 |

OTHER PUBLICATIONS

LG Electronics, "Remaining issues on M-PDCCH transmission", 3GPP TSG RAN WG1 Meeting #83, R1-156840, Nov. 2015, 6 pages.

Huawei, et al., "Consideration on the same AL and CCE index for M-PDCCH repetition", 3GPP TSG RAN WG1 Meeting #83, R1-156443, Nov. 2015, 6 pages.

\* cited by examiner

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

(a) sPDCCH monitoring window = 12 OFDM symbols (b) sPDCCH monitoring window = 4 OFDM symbols

DOWNLINK CHANNEL RECEPTION METHOD AND USER EQUIPMENT, AND DOWNLINK CHANNEL TRANSMISSION METHOD AND BASE STATION

CROSS-REFERENCE TO RELATED APPLICATIONS

This application is the National Stage filing under 35 U.S.C. 371 of International Application No. PCT/KR2016/014459, filed on Dec. 9, 2016, which claims the benefit of U.S. Provisional Application No. 62/266,001, filed on Dec. 11, 2015, and 62/278,431, filed on Jan. 13, 2016, the contents of which are all hereby incorporated by reference herein in their entirety.

TECHNICAL FIELD

The present invention relates to a wireless communication system, and more particularly, to a method and apparatus for transmitting/receiving a downlink channel.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

According to the present invention, a downlink control channel can be transmitted in a random number of OFDM symbols. The downlink control channel may be transmitted in a first number of OFDM symbols or a second number of OFDM symbols. To receive the downlink control channel, a user equipment can monitor a first downlink control channel candidate that spans the first number of OFDM symbols within a transmission time interval (TTI) and monitor a second downlink control channel candidate that spans the second number of OFDM symbols within the TTI. The downlink control channel may be transmitted using one or more control channel elements (CCEs), each of which is configured with resources in the same OFDM symbol.

In an aspect of the present invention, provided is a method for receiving a downlink channel by a user equipment (UE) in a wireless communication system, including: receiving a downlink control channel carrying downlink control information within a transmission time interval (TTI); and receiving a downlink data channel based on the downlink control information within the TTI. Receiving of the downlink control channel may include monitoring a first downlink control channel candidate spanning T1 OFDM symbols within the TTI and monitoring a second downlink control channel candidate spanning T2 OFDM symbols within the TTI. The downlink control channel may be the first downlink control channel candidate or the second downlink control channel candidate. T1 may be different from T2. The downlink control channel may be received using one or more control channel element (CCEs), and each of the one or more CCEs may be configured with resources in the same OFDM symbol.

In another aspect of the present invention, provided is a method for transmitting a downlink channel by a base station (BS) in a wireless communication system, including: transmitting a downlink control channel carrying downlink control information within a transmission time interval (TTI); and transmitting a downlink data channel based on the downlink control information within the TTI. The downlink control channel may be transmitted on either a first downlink control channel candidate spanning T1 OFDM symbols within the TTI or a second downlink control channel candidate spanning T2 OFDM symbols within the TTI, and T1 may be different from T2. The downlink control channel may be transmitted using one or more control channel element (CCEs), and each of the one or more CCEs may be configured with resources in the same OFDM symbol.

In a further aspect of the present invention, provided is a user equipment (UE) for receiving a downlink channel in a wireless communication system, including: a radio frequency (RF) unit; and a processor configured to control the RF unit. The processor may be configured to: control the RF unit to receive a downlink control channel carrying downlink control information within a transmission time interval (TTI); and control the RF unit to receive a downlink data channel based on the downlink control information within the TTI. In addition, wherein the processor may be configured to monitor a first downlink control channel candidate spanning T1 OFDM symbols within the TTI and monitor a second downlink control channel candidate spanning T2 OFDM symbols within the TTI in order to receive the downlink control channel. The downlink control channel may be the first downlink control channel candidate or the second downlink control channel candidate. T1 may be different from T2. The downlink control channel may be received using one or more control channel element (CCEs), and each of the one or more CCEs may be configured with resources in the same OFDM symbol.

In still another aspect of the present invention, provided is a base station (BS) for transmitting a downlink channel in a wireless communication system, including: a radio frequency (RF) unit; and a processor configured to control the RF unit. The processor may be configured to: control the RF unit to transmit a downlink control channel carrying downlink control information within a transmission time interval (TTI); and control the RF unit to transmit a downlink data channel based on the downlink control information within the TTI. The downlink control channel may be transmitted on either a first downlink control channel candidate spanning T1 OFDM symbols within the TTI or a second downlink control channel candidate spanning T2 OFDM symbols within the TTI, and T1 may be different from T2. The downlink control channel may be transmitted using one or more control channel element (CCEs), and each of the one or more CCEs may be configured with resources in the same OFDM symbol.

In each aspect of the present invention, the TTI may be equal to or smaller than 0.5 ms in a time domain.

In each aspect of the present invention, the TTI may be configured within a different TTI with a length of 1 ms in a time domain.

In each aspect of the present invention, the first downlink control channel candidate may occupy L1 CCEs, the second downlink control channel candidate may occupy L2 CCEs, and L2=(T1/T2)*L1, where L1 and L2 are positive integers.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
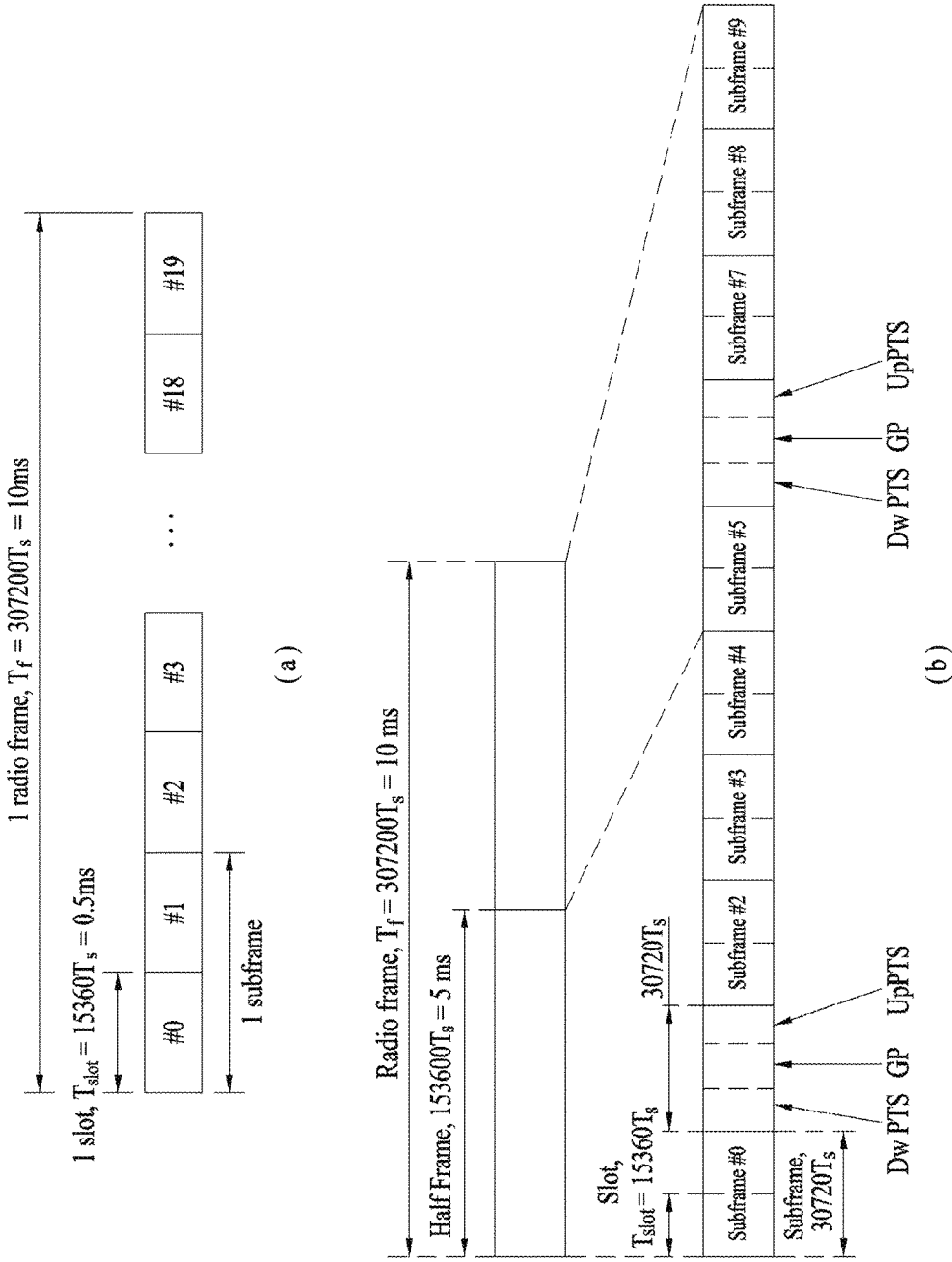
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 3, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |

TABLE 2-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 8 | $24144 \cdot T_s$ | — | — | — | — | — |
| 9 | $13168 \cdot T_s$ | — | — | — | — | — |

Figure 2:
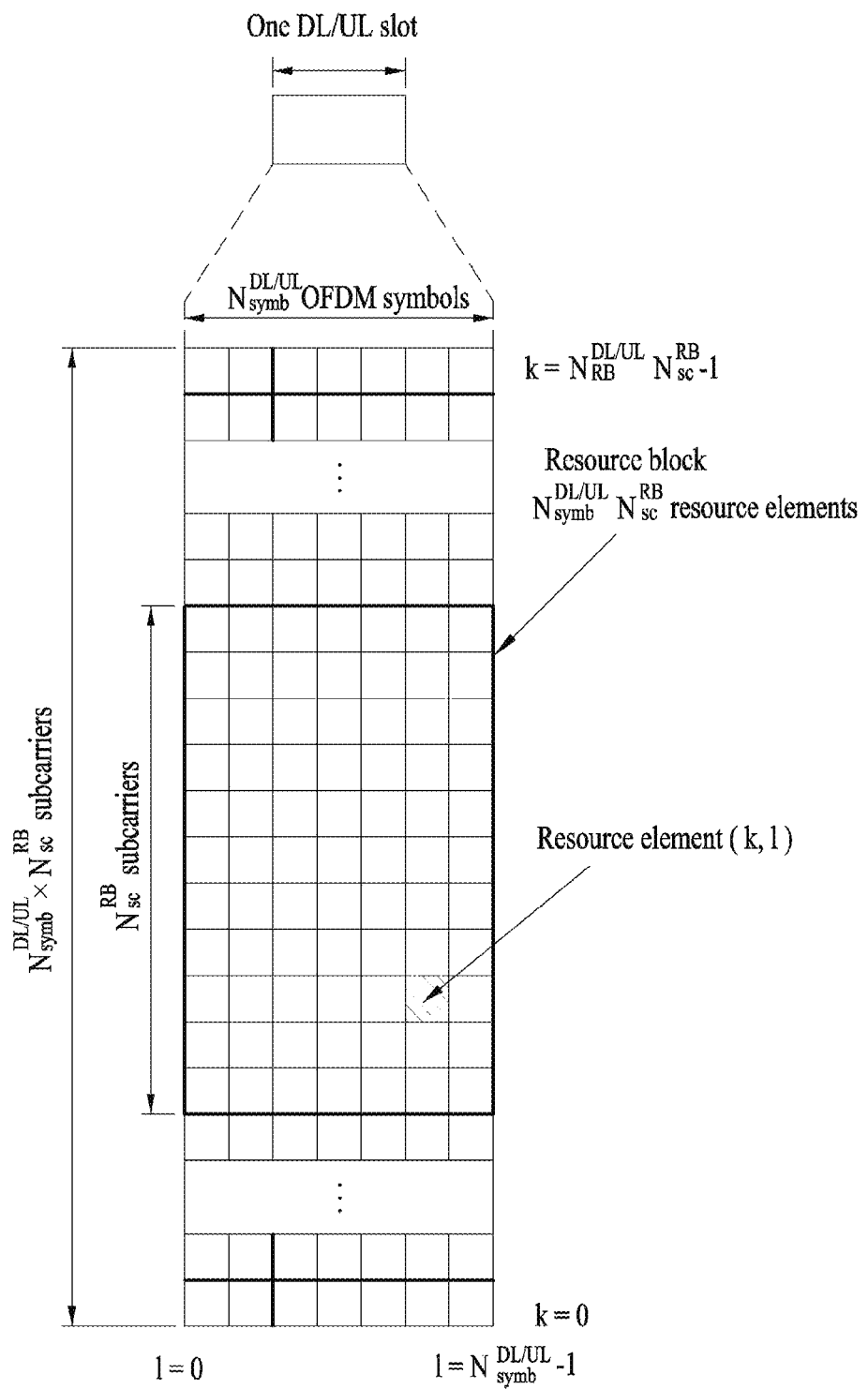
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/DL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and/is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
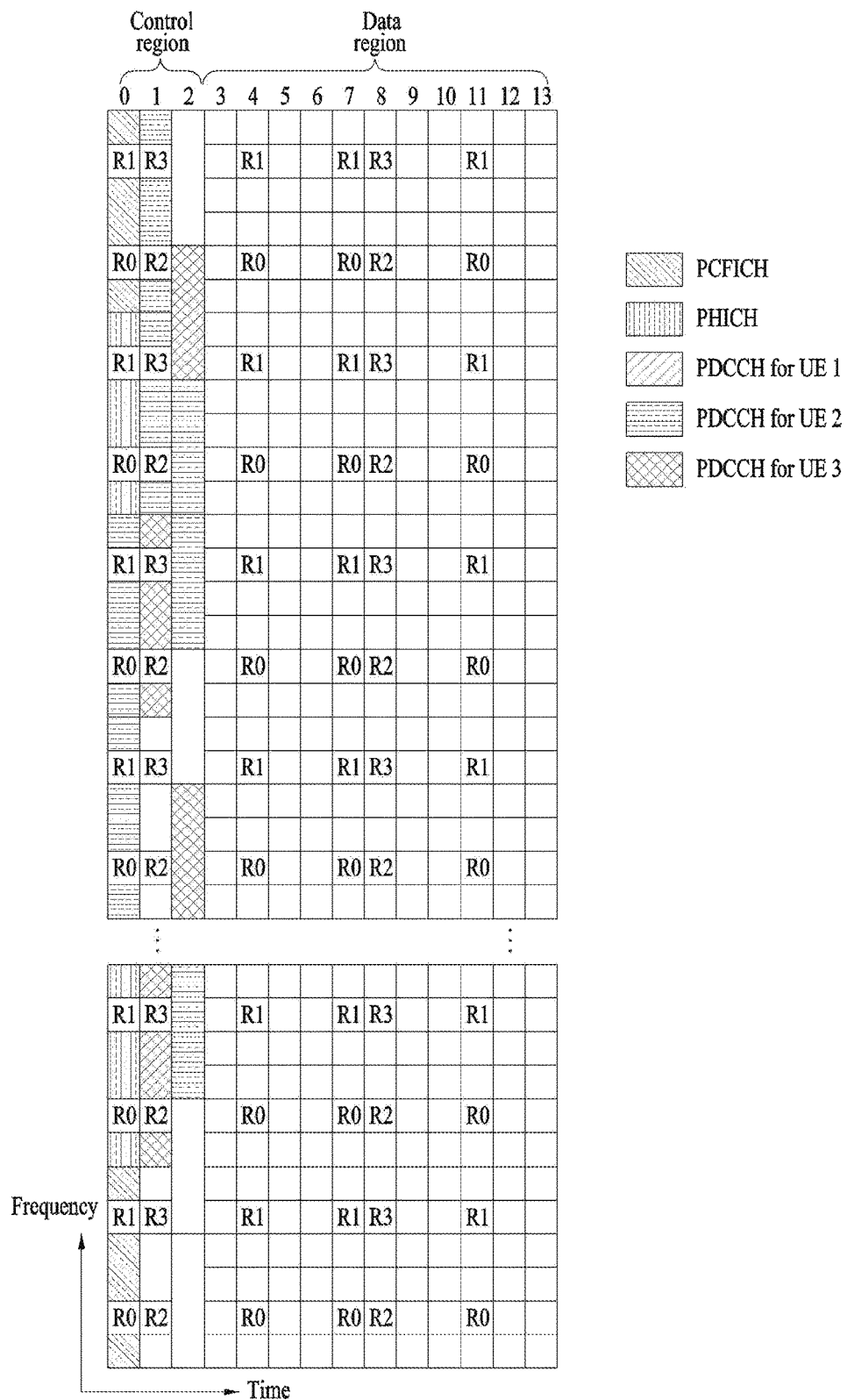
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB}\leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 4

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 4 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE. Table 5 shows transmission modes for configuring the MIMO technology and DCI formats used by the UE to perform blind decoding in the corresponding transmission modes. In particular, Table 6 shows a relationship between the PDCCH and PDSCH configured by a cell radio network temporary identifier (cell RNTI or C-RNTI).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in Table 5, other transmission modes in addition to the transmission modes defined in Table 5 may be defined.

Referring to Table 5, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

The PDCCH is allocated to first m number of OFDM symbol(s) within a subframe, where m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1, 2, 4, 8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following Table shows an example of aggregation levels for defining SS.

TABLE 6

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
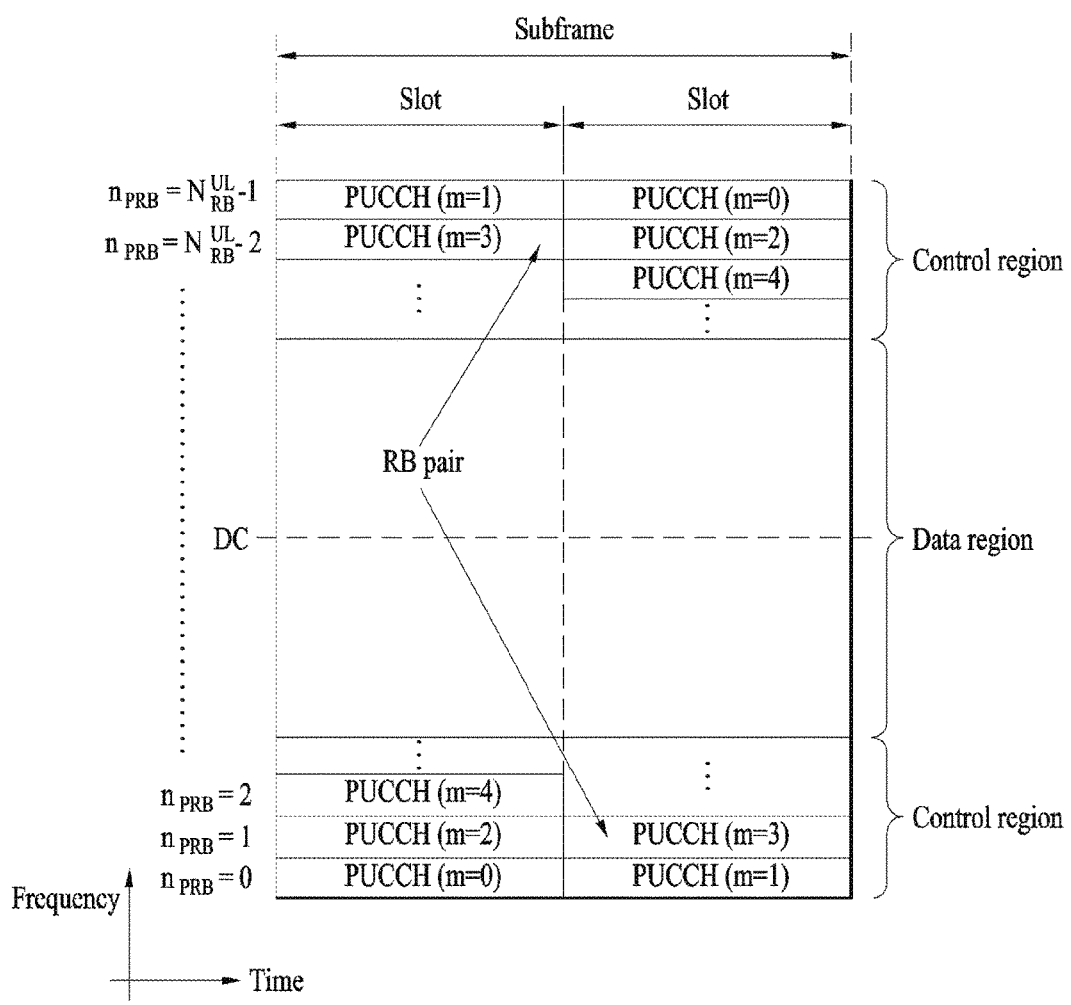
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Various PUCCH formats can be used for UCI transmission. UCI carried by one PUCCH may have different size and usage according to PUCCH formats, and size thereof may vary according to coding rates.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time−1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the other hand, since a plurality of serving cells can be configured in a multi-carrier system, transmission of UL/DL grant through a serving cell having a good channel state may be allowed. In this way, when a cell carrying UL/DL grant corresponding to scheduling information is different from that where UL/DL transmission corresponding to the UL/DL grant is performed, it can be referred to as cross-carrier scheduling.

Hereinafter, the case where a cell is scheduled by itself and the case where a cell is scheduled by another cell will be respectively referred to as self-CC scheduling and cross-CC scheduling.

The 3GPP LTE/LTE-A system can support aggregation of a plurality of CCs and cross carrier-scheduling operation based on the aggregation to improve a data transmission rate and achieve stable control signaling.

When the cross-carrier scheduling (or cross-CC scheduling) is applied, a PDCCH carrying a DL grant, that is, downlink allocation for DL CC B or DL CC C may be transmitted through DL CC A, and a corresponding PDSCH may be transmitted through DL CC B or DL CC C. In addition, a carrier indicator field (CIF) may be introduced for the cross-CC scheduling. The CIF can be included or not in the PDCCH, and this can be configured through higher layer signaling (e.g., RRC signaling) semi-statically and UE-specifically (or UE-group-specifically). In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port(s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. A typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

Figure 5:
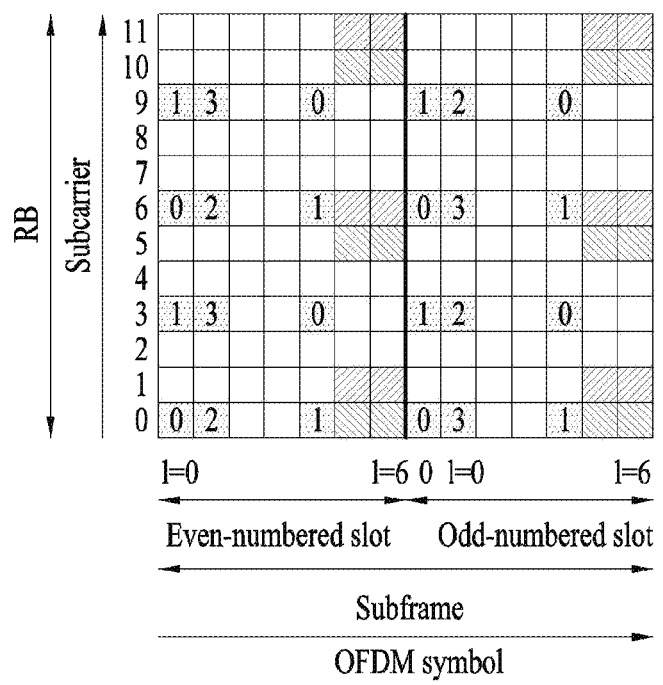
FIG. 5 illustrates configuration of cell specific reference signals (CRSs) and user specific reference signals (UE-RS).

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a^{(p)}_{k,l}$ in a subframe according to the following equation.

$$a_{k,l}^{(p)} w_p(l') \cdot r(3 \cdot l' \cdot N_{RB}^{max,DL} + 3 \cdot n_{PRB} + m') \quad \text{Equation 1}$$

where $w_p(i)$, l', m' are given as follows.
Equation 2

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where $n_s$ is the slot number within a radio frame and an integer among 0 to 19. The sequence $\overline{w}_p(i)$ for normal CP is given according to the following equation.

TABLE 7

| Antenna port p | $[\overline{w}_p^{(0)} \ \overline{w}_p^{(1)} \ \overline{w}_p^{(2)} \ \overline{w}_p^{(3)}]$ |
| --- | --- |
| 7 | [+1 +1 +1 +1] |
| 8 | [+1 −1 +1 −1] |
| 9 | [+1 +1 +1 +1] |

TABLE 7-continued

| Antenna port p | $[\overline{w}_p^{(0)} \ \overline{w}_p^{(1)} \ \overline{w}_p^{(2)} \ \overline{w}_p^{(3)}]$ |
| --- | --- |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{Equation 3}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

where c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{Equation 4}$$

where $N_C$=1600 and the first m-sequence is initialized with $x_1(0)$=1, $x_1(n)$=0, n=1, 2, . . . , 30. The initialization of the second m-sequence is denoted by $c_{init} = \Sigma_{i=0}^{30} x_2(i) \cdot 2^i$ with the value depending on the application of the sequence.

In Equation 3, the pseudo-random sequence generator for generating c(i) is initialized with $c_{init}$ at the start of each subframe according to the following equation.

$$c_{init} = (\lfloor n_s/2 \rfloor + 1) \cdot (2n_{ID}^{(nSCID)} + 1) \cdot 2^{16} + n_{SCID} \quad \text{Equation 5}$$

where the quantities $n^{(i)}_{ID}$, i=0, 1, which is corresponding to $n^{(nSCID)}_{ID}$, are given by a physical layer cell identity $N^{cell}_{ID}$ if no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Math FIG. 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Figure 6:
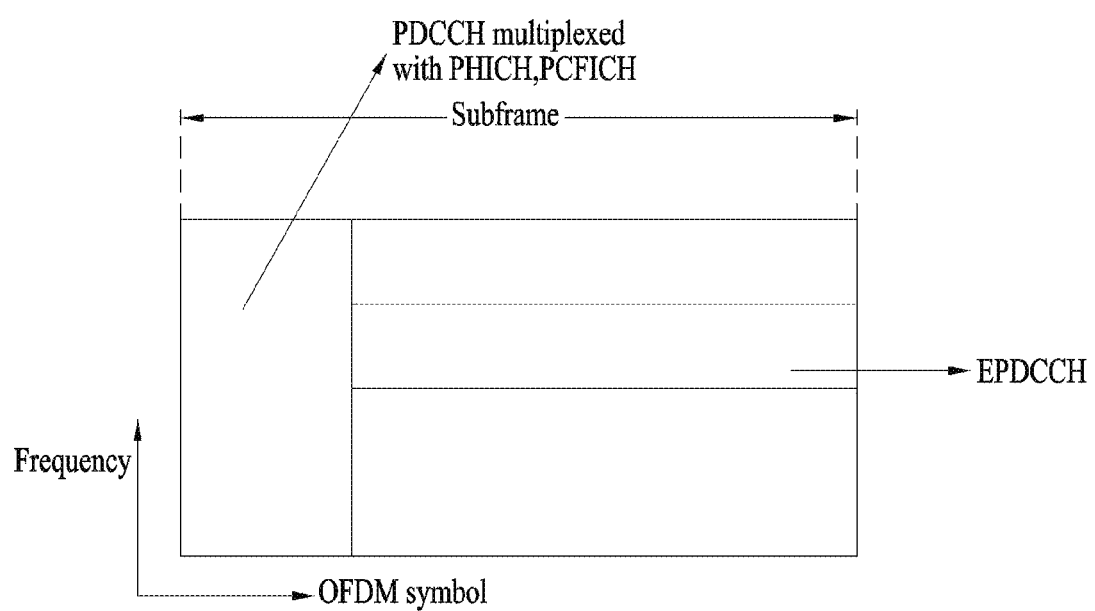
FIG. 6 is an example of a downlink control channel configured in a data region of a DL subframe.

FIG. 6 is an example of a downlink control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1, 2, 4, 8, 16, 32\}$ is defined by a set of EPDCCH candidates. For an EPDCCH-PRB-set p, the ECCEs corresponding to EPDCCH candidate m of the search space $ES^{(L)}_k$ are given by the following equation.

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i \quad \text{Equation 6}$$

where $i=0, \ldots, L-1$. $b=n_{CI}$ if the UE is configured with a carrier indicator field for the serving cell on which EPDCCH is monitored, otherwise $b=0$. $n_{CI}$ is the carrier indicator field (CIF) value, which is the same as a serving cell index (ServCellIndex). $m=0, 1, \ldots, M^{(L)}_p-1$, $M^{(L)}_p$ is the number of EPDCCH candidates to monitor at aggregation level L in EPDDCH-PRB-set p. The variable $Y_{p,k}$ is defined by '$Y_{p,k}=(A_p \cdot Y_{p,k-1}) \bmod D$', where $Y_{p,k-1}=n_{RNTI}0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 8, the number of EREGs per ECCE is given by Table 9. Table 8 shows an example of supported EPDCCH formats, and Table 9 shows an example of the number of EREGs per ECCE, $N^{EREG}_{ECCE}$. Both localized and distributed transmission is supported.

TABLE 8

Number of ECCEs for one EPDCCH, $N^{EPDCCH}_{ECCE}$

| | Case A | | Case B | |
|---|---|---|---|---|
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 9

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{sP}_{RB}/N^{EREG}_{ECCE}$))mod $N^{sp}_{RB}$ for distributed mapping, where j=0, 1, . . . , $N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 8 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB+n_{RNTI}}$ mod min($N^{ECCE}_{EPDCCH}$, $N^{ECCE}_{RB}$) where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 10

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Special subframes, Normal subframes, configurations 3, 4, 8 |
| 0 | 107 | 107 | 107 |
| 1 | 108 | 109 | 108 |
| 2 | 109 | — | — |
| 4 | 110 | — | — |

For distributed transmission, each resource element in an EREG is associated with one out of two antenna ports in an alternating manner where p∈{107, 109} for normal cyclic prefix and p∈{107, 108} for extended cyclic prefix.

Hereinafter, the PDCCH and EPDCCH will be commonly referred to as the PDCCH or (E)PDCCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The embodiments of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

Figure 7:
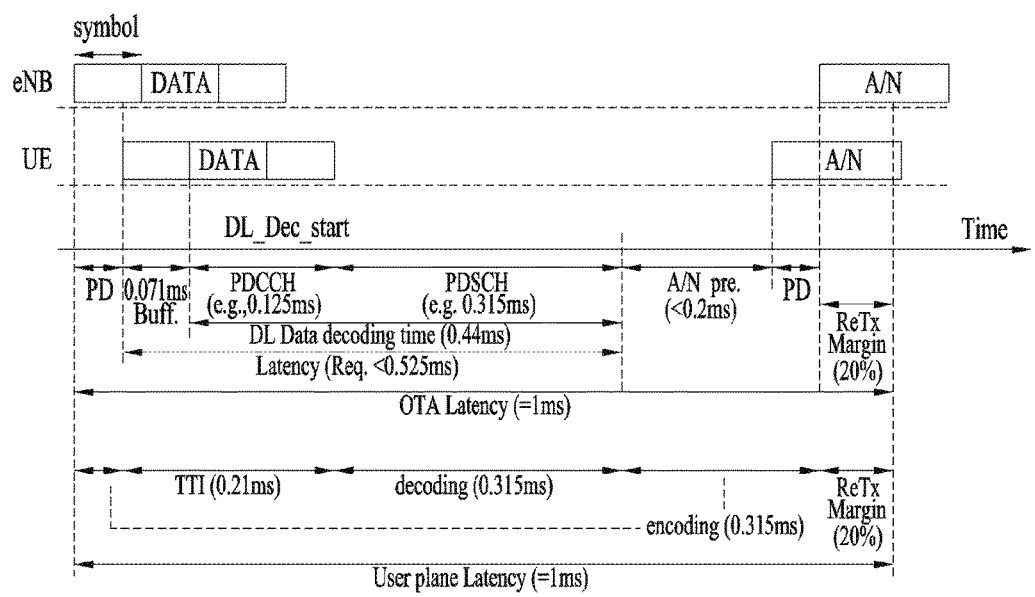
FIG. 7 illustrates the length of a transmission time interval (TTI) which is needed to implement low latency.

FIG. 7 illustrates the length of a transmission time interval (TTI) which is needed to implement low latency.

Referring to FIG. 7, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 7 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In addition, in the following description, a physical downlink control channel/physical downlink data channel/physical uplink control channel/physical uplink data channel transmitted in units of the default/main TTI are referred to as a PDCCH/PDSCH/PUCCH/PUSCH, and a PDCCH/PDSCH/PUCCH/PUSCH transmitted within an sTTI or in units of sTTI are referred to as sPDCCH/sPDSCH/sPUCCH/sPUSCH. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

Figure 8:
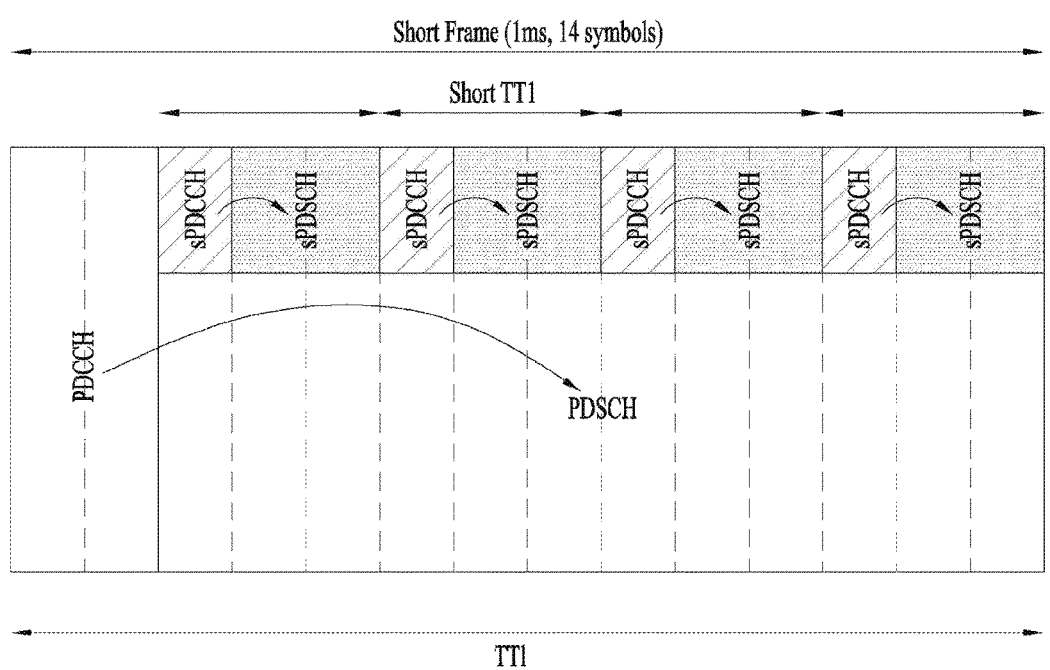
FIG. 8 illustrates an example of a shortened TTI and an example of transmission of a control channel and a data channel in a shortened TTI.

FIG. 8 illustrates an sTTI and transmission of a control channel and data channel within the sTTI.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 8, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

The present invention is directed to a method of providing a plurality of different services in one system by applying different system parameters according to the services or UEs to satisfy the requirements for the services. In particular, for a service/UE sensitive to latency, an sTTI may be used to send data in a short time and to allow a response to the data to be sent in a short time. Thereby, the latency may be reduced as much as possible. On the other hand, for a service/UE which is less sensitive to latency, a longer TTI may be used to transmit/receive data. For a service/UE which is sensitive to power efficiency rather than to latency, data may be repeatedly transmitted at the same low power or may be transmitted in units of a longer TTI. The present invention proposes a transmission method and multiplexing method for controlling information and data signals to enable the operations described above. The proposed methods are associated with the transmission aspect of a network, the reception aspect of a UE, multiplexing of multiple TTIs in one UE, and multiplexing of multiple TTIs between multiple UEs.

Figure 9:
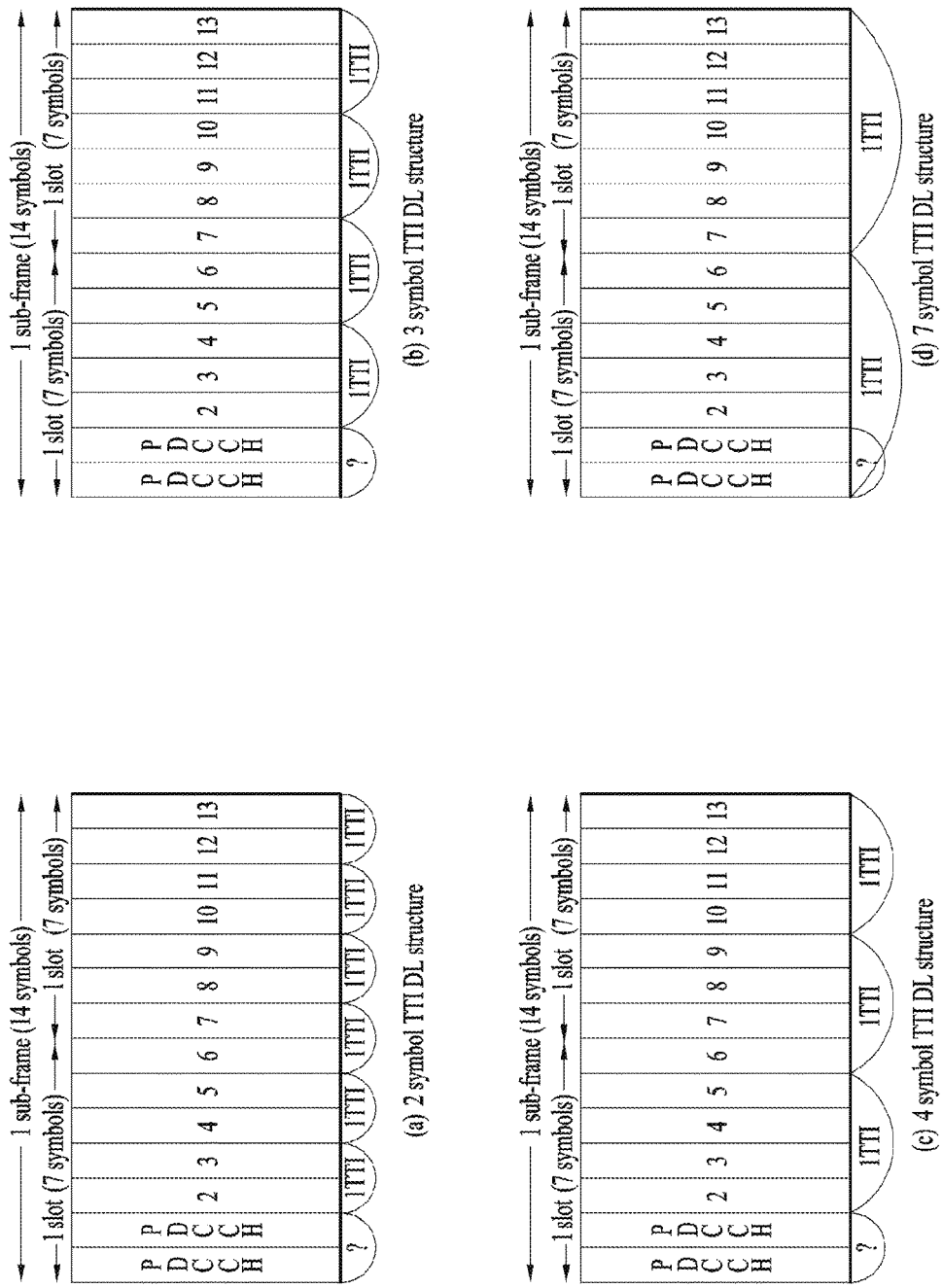
FIG. 9 illustrates an example of short TTIs configured in a legacy subframe.

FIG. 9 illustrates an example of short TTIs configured in a legacy subframe.

In legacy LTE/LTE-A, if a subframe of 1 ms has a normal CP, the subframe consists of 14 OFDM symbols. If a TTI shorter than 1 ms is configured, a plurality of TTIs may be configured within one subframe. As shown in FIG. 9, each TTI may consist of, for example, 2 symbols, 3 symbols, 4 symbols, or 7 symbols. Although not shown in FIG. 9, a TTI consisting of one symbol may also be considered. If one symbol is one TTI unit, 12 TTIs may be configured in the default TTI of 1 ms, on the assumption that the legacy PDCCH is transmittable within two OFDM symbols. Similarly, when the two leading OFDM symbols are assumed to be the legacy PDCCH region, and two symbols are taken as one TTI unit, 6 TTIs may be configured within the default TTI. If three symbols are taken as one TTI, 4 TTIs may be configured within the default TTI. If 4 symbols are taken as one TTI unit, 3 TTIs may be configured within the default TTI.

If the 7 symbols are configured as one TTI, a TTI consisting of 7 leading symbols including the legacy PDCCH region and a TTI consisting of 7 subsequent symbols may be configured. If one TTI consists of 7 symbols, a UE supporting the short TTI assumes that the two leading OFDM symbols on which the legacy PDCCH is transmitted are punctured or rate-matched and the data and/or control channels of the UE are transmitted on the five subsequent symbols in the TTI (i.e., the TTI of the first slot) positioned at the leading part of one subframe (i.e., default TTI). On the other hand, the UE may assume that the data and/or control channels can be transmitted on all 7 symbols in a TTI positioned at the rear part of the same subframe (i.e., the TTI of the second slot) without any rate-matched or punctured resource region.

Puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

<OFDM Numerology>

The new RAT system uses an OFDM transmission scheme or a similar transmission scheme. For example, the new RAT system may follow the OFDM parameters defined in the following table.

TABLE 11

| Parameter | Value |
| --- | --- |
| Subcarrier-spacing ($\Delta f$) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Self-Contained Subframe Structure>

Figure 10:
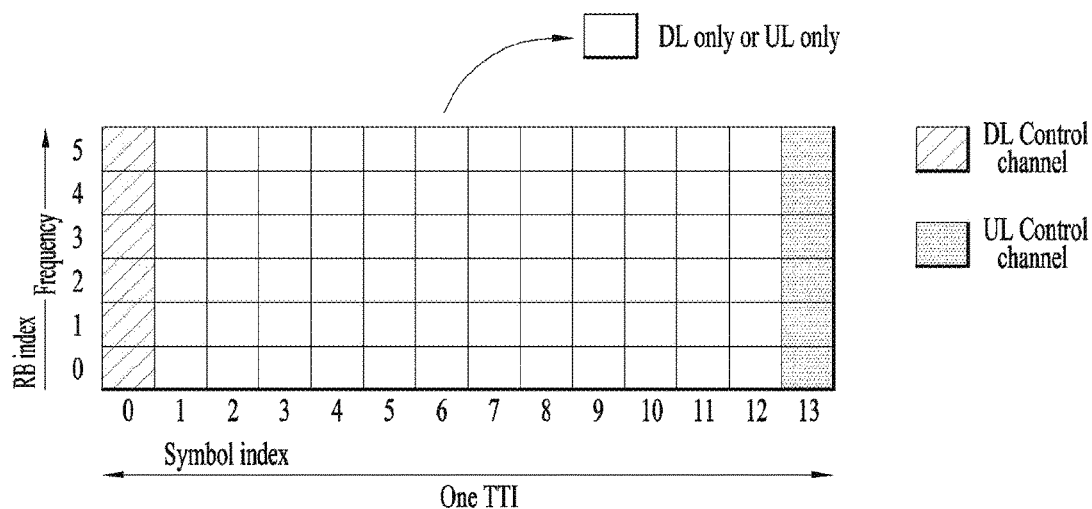
FIG. 10 illustrates a self-contained subframe structure.

FIG. 10 illustrates a self-contained subframe structure.

In order to minimize the latency of data transmission in the TDD system, a self-contained subframe structure is considered in the new fifth-generation RAT.

In FIG. 10, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 10, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Unlike the conventional LTE/LTE-A system where all UEs and eNBs perform signal transmission and reception on a 1 ms basis due to the TTI with a fixed length of 1 ms, the present invention proposes the system where a UE and an eNB can transmit and receive signals using a plurality of TTI lengths in the state that the TTI has a plurality of lengths. In particular, the present invention proposes a method for allowing an eNB and a UE to communicate to each other by supporting various TTI lengths and variability thereof in the state that the TTI length can be changed and a multiplexing scheme for each channel and UE. Although the present invention is described based on the conventional LTE/LTE-A system, the invention can be applied to other systems including the LTE/LTE-A system or the RAT.

The sPDCCH referred to in the present invention may include a PDCCH transmitted in the new RAT environment as well as a PDCCH transmitted in an sTTI in the LTE/LTE-A system.

To transmit data using a TTI of which the length is dynamically changed based on a plurality of TTI lengths, a control channel (e.g., sPDCCH) for scheduling the data should also be transmitted using various transmission time lengths. For example, to schedule data transmitted with a short TTI length, the sPDCCH also needs to be transmitted with a short transmission time length. On the contrary, to schedule data transmitted with a long TTI length, the sPDCCH may also be transmitted with a long transmission time length. Thus, an SPDCCH search space needs to be designed such that the transmission time length of the sPDCCH can be dynamically changed depending on the size of the TTI, where data is transmitted.

Figure 11:
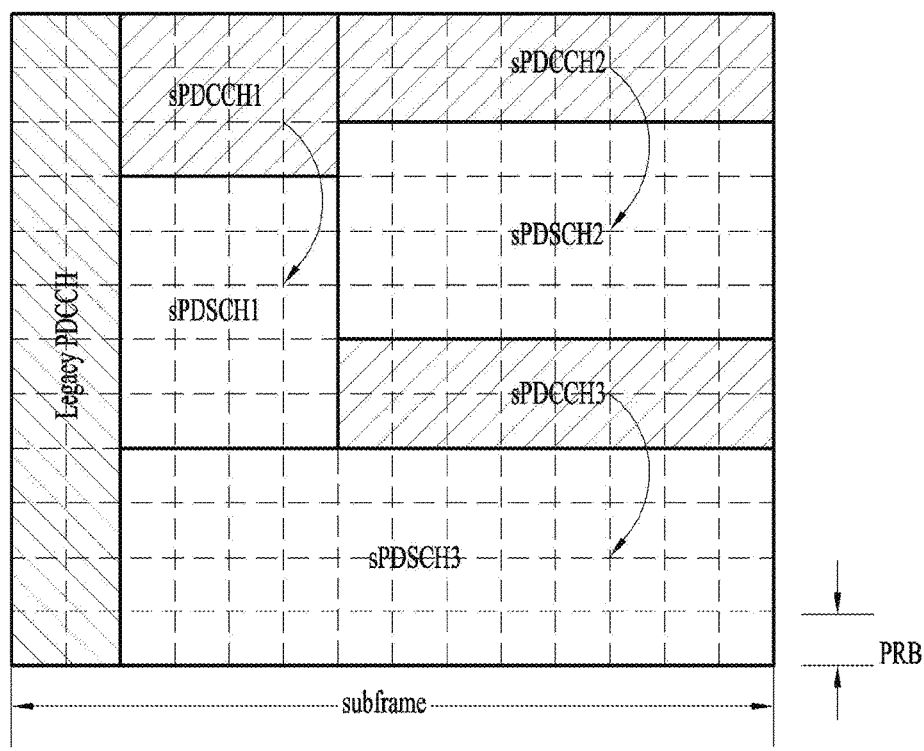
FIG. 11 illustrates an sPDCCH and transmission of a corresponding sPDSCH in a subframe where a legacy PDCCH is present.

FIG. 11 illustrates an sPDCCH and transmission of a corresponding sPDSCH in a subframe where a legacy PDCCH is present.

Considering eNB's sPDCCH transmission flexibility, it may be helpful to transmit the sPDCCH using various lengths. For example, when the sPDSCH is transmitted in a partial OFDM symbol(s) in a specific PRB, if the sPDCCH is able to be transmitted in the remaining OFDM symbol(s) in the specific PRB, it is possible to achieve efficient use of resources.

The present invention proposes an sPDCCH search space where the sPDCCH can have various transmission lengths and the SPDCCH transmission time length (hereinafter abbreviated as the transmission length) can be dynamically selected and then transmitted.

As described above, the legacy PDCCH is transmitted on an aggregation of one or more CCEs, each including 9 REGs. The 9 REGs in each CCE are distributed through interleaving in the time and frequency domains. That is, the legacy PDCCH spans an OFDM symbol(s) included in the legacy control region in the time domain and is distributed over the system bandwidth in the frequency domain. In the case of the legacy PDCCH, a PDCCH monitoring window is configured with an OFDM symbol(s) indicated by the PCFICH in each downlink time interval except the discontinuous reception (DRX) duration. On the other hand, the EPDCCH is configured with an aggregation of one or more ECCEs. If the EPDCCH is configured to be transmitted through distribution, each ECCE of the EPDCCH is configured with EREGs from a plurality of PRB pairs. If the EPDCCH is configured to be transmitted through localization, it is configured with EREGs from a single PRB pair. Since EREGs are configured with REs distributed in a single PRB pair, the EPDCCH is transmitted across from the start OFDM symbol of the EPDCCH in a subframe and the last OFDM symbol of the subframe in the corresponding PRB pair. Eventually, in the case of the EPDCCH, an EPDCCH monitoring window is configured with from an OFDM symbol set to the EPDCCH start OFDM symbol to the last OFDM symbol in the subframe where the EPDCCH is configured.

To allow the eNB to transmit the sPDCCH by dynamically selecting the transmission length, a method for informing a UE(s) of the PDCCH monitoring window through the PCFICH like the legacy PDCCH can be considered. However, if the PCFICH is transmitted in new RAT environment operating based on analog beamforming (ABF), the ABF is applied to PCFICH transmission so that only UEs along the corresponding beam direction can know the number of OFDM symbols used for PDCCH transmission. For example, assuming that the PCFICH is transmitted in the first OFDM symbol, if a different beam direction is configured for each DL control channel symbol, UEs corresponding to targets where a DL control channel is transmitted in the second OFDM symbol may not detect the PCFICH transmitted in the first OFDM symbol. However, if the PCFICH is transmitted in each OFDM symbol where the PDCCH can be transmitted, downlink control overhead may be significantly increased due to the increased PCFICH transmission.

Therefore, according to the present invention, the UE can be configured to perform monitoring of a plurality of sPDCCH transmission lengths T in one sPDCCH search space in order to enable the eNB to transmit the sPDCCH by dynamically selecting the transmission length. In the sPDCCH search space, the UE can monitor sPDCCH decoding candidates (i.e., sPDCCH candidates) having multiple T values and sPDCCH decoding candidates having multiple ECCE aggregation levels in the frequency domain. That is, when resources for transmitting the sPDCCH span T OFDM symbol(s) in the time domain and are configured with L ECCE(s) in the frequency domain, the UE can monitor sPDCCH decoding candidates for various combinations of {L, T} in the SPDCCH search space.

<A. sPDCCH Search Space>

Figure 12:
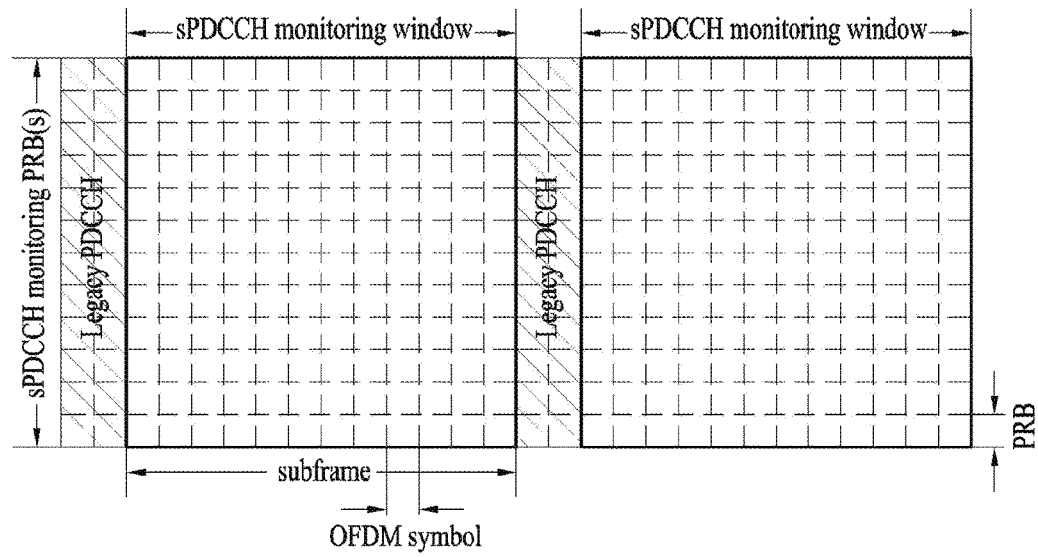
FIG. 12 illustrates an sPDCCH search space according to the present invention.
Figure 12:
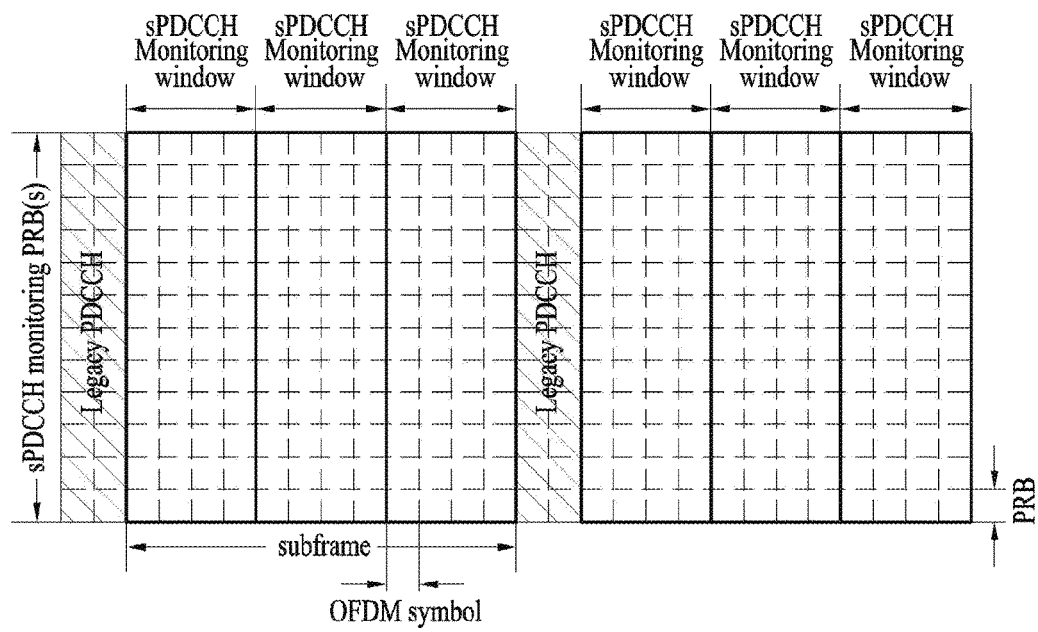

FIG. 12 illustrates an sPDCCH search space according to the present invention.

An sPDCCH monitoring window corresponding to a time unit where the UE perform monitoring for the sPDCCH (i.e., the time length of the sPDCCH search space) can be composed of multiple OFDM symbols. Specifically, the sPDCCH monitoring window can be configured as follows.

Option (a): The length of the sPDCCH monitoring window may be fixed to one subframe. For example, referring to FIG. 12 (a), when the legacy PDCCH resource region is not included in the sPDCCH monitoring window, the length of the sPDCCH monitoring window may be twelve OFDM symbols at all times.

Option (b): The length of the sPDCCH monitoring window may be equal to the maximum TTI length among TTI lengths supported by the cell. Alternatively, the length of the sPDCCH monitoring window may be equal to the maximum TTI length among TTI length(s) monitored by the UE. When the maximum TTI length corresponds to one subframe or twelve OFDM symbols except the legacy PDCCH region, Option (b) becomes identical to Option (a). The maximum TTI length may be greater than 1 ms. If the maximum TTI length monitored by the UE is four subframes, the length of the sPDCCH monitoring window also becomes four subframes. FIG. 12 (b) illustrates sPDCCH monitoring windows when the maximum TTI length monitored by the UE is four OFDM symbols.

Option (c): The length of the sPDCCH monitoring window may be differently defined according to the time length in which the sPDCCH is transmitted. For example, the monitoring window for the sPDCCH of which the transmission length is T OFDM symbol(s) may be T OFDM symbol(s). If the UE intends to monitor the sPDCCH with respect to multiple sPDCCH transmission lengths, the UE may monitor the sPDCCH using a different sPDCCH monitoring window for each of the multiple sPDCCH transmission lengths T.

Frequency resources where the UE performs monitoring for the sPDCCH may be configured with a partial PRB(s). A PRB(s) region constituting the sPDCCH search space may be configured as follows.

Option (1): The PRB(s) region where the UE performs monitoring for the SPDCCH may be the same with respect to all sPDCCH transmission lengths. The PRB(s) region where the UE performs monitoring for the sPDCCH may be fixed or informed the UE through a higher layer signal.

Option (2): The PRB(s) region where the UE performs monitoring for the SPDCCH may vary in all sPDCCH transmission lengths. That is, the number and/or location of PRB(s) to be monitored by the UE with respect to the individual sPDCCH transmission lengths T may be given separately. The PRB region for monitoring the sPDCCH with respect to each sPDCCH transmission length may be fixed or informed the UE through a higher layer signal.

<B. Resources of sPDCCH Candidates>

Figure 13:
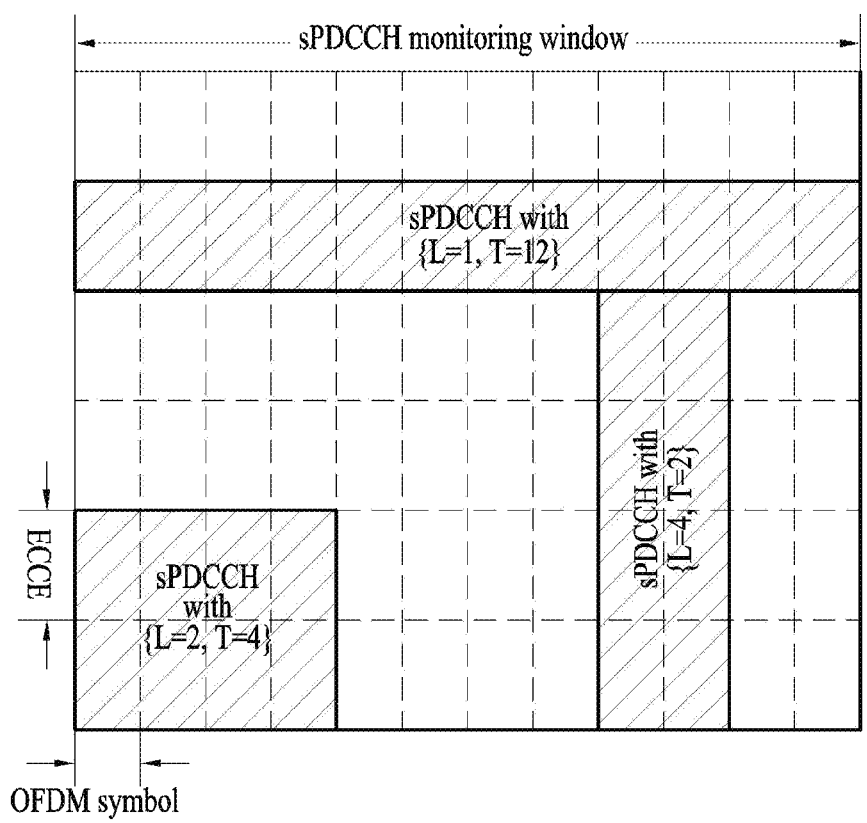
FIG. 13 illustrates sPDCCH candidates according to the present invention.

FIG. 13 illustrates sPDCCH candidates according to the present invention.

As illustrated in FIG. 13, one sPDCCH includes L (consecutive or non-consecutive) ECCE(s) existing in an sPDCCH monitoring PRB(s) in the frequency domain and T consecutive OFDM symbol(s) existing in the sPDCCH monitoring window in the time domain. The number L of ECCEs for the sPDCCH transmission and the number T of OFDM symbols for the sPDCCH transmission may have a plurality of values, respectively. For example, the number L of ECCEs where the sPDCCH can be transmitted may be {1, 2, 4, 8}, and the number T of OFDM symbols in which the sPDCCH can be transmitted may be {2, 4, 12}.

Time Resources of sPDCCH Candidates

Figure 14:
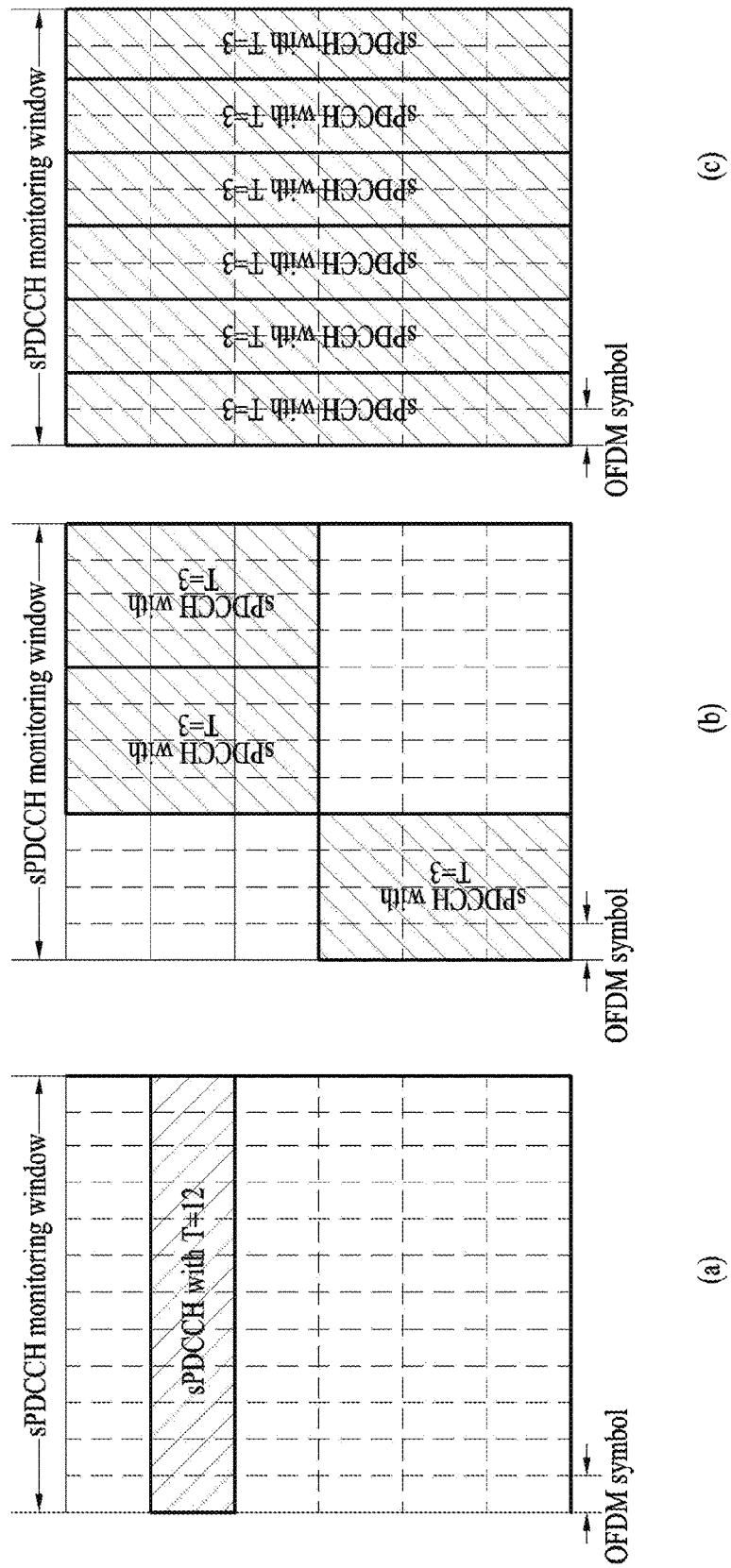
FIG. 14 illustrates a time resource(s) of sPDCCH candidates according to the present invention.

FIG. 14 illustrates a time resource(s) of sPDCCH candidates according to the present invention.

When the sPDCCH is transmitted in T OFDM symbol(s), the sPDCCH transmission may start at a plurality of OFDM symbols within the sPDCCH monitoring window. For example, as illustrated in FIG. 14, in the case of the sPDCCH with the sPDCCH transmission length T, the transmission thereof may start with a period of T OFDM symbol(s) in the sPDCCH monitoring window. The UE performs monitoring of the sPDCCH with respect to the sPDCCH transmission length T every T OFDM symbol(s) within the sPDCCH monitoring window.

ECCE Resources of sPDCCH Candidates

The present invention proposes an ECCE resource mapping method suitable when a plurality of sPDCCH transmission lengths T are supported in the sPDCCH search space. In the prior art, CCE resource mapping for the legacy PDCCH has been performed in an OFDM symbol(s) region where the PDCCH was transmitted, and ECCE resource mapping for the EPDCCH has been performed on a subframe basis. That is, in the case of the legacy (E)PDCCH, the (E)PDCCH has been monitored using a single transmission time length. On the other hand, in the case of the sPDCCH with the plurality of transmission lengths T, an (E)CCE resource mapping method therefor needs to be defined. The present invention proposes the following ECCE resource mapping methods for the sPDCCH.

ECCE Resource Mapping Method 1

To support the plurality of sPDCCH transmission lengths T in the sPDCCH search space, the legacy ECCE resource mapping may be reused. One EREG is configured using 9 REs existing in one PRB, and one ECCE is configured using 4 EREGs among EREGs existing in an EPDCCH-PRB set.

The legacy ECCE resource mapping is performed based on one subframe. In the case of the sPDCCH transmitted using only T OFDM symbol(s) in a subframe, the SPDCCH transmission may be rate-matched (or punctured) in OFDM symbol(s) except the T OFDM symbol(s) where the sPDCCH is transmitted.

Even though the sPDCCH is transmitted using the same aggregation level (AL), the actual amount of resources used for the sPDCCH transmission may vary depending on the value (size) of the transmission length T used for the sPDCCH transmission. For example, in the case of the sPDCCH with T=12 OFDM symbols, the amount of resources used for the sPDCCH transmission is about three times greater than that used for transmitting the sPDCCH with T=4 OFDM symbols although the same AL is used. Therefore, to support the same range of effective code rates (or effective sPDCCH transmission resources) in transmitting the sPDCCH, the present invention proposes to change the range (or values) of the AL for the sPDCCH transmission according to the value of T. For example, assuming that the maximum value of T supported by the cell or monitored by the UE is Tmax and ALs that can be held by the sPDCCH transmitted with Tmax are {AL1, AL2, AL3, AL4}, ALs that can be held by the sPDCCH transmitted with T=Tmax/D may be set to {AL1*D, AL2*D, AL3*D, AL4*D}, where D indicates a ratio of Tmax to T (i.e., D=Tmax/T).

ECCE Resource Mapping Method 2

Figure 15:
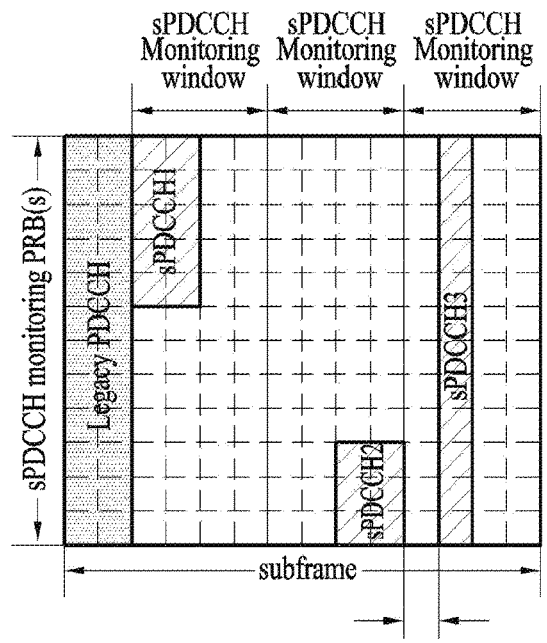
FIG. 15 illustrates an ECCE resource mapping method according to the present invention.

FIG. 15 illustrates an ECCE resource mapping method according to the present invention.

In order to support the plurality of sPDCCH transmission lengths T in the sPDCCH search space, EREG to RE mapping may be performed based on the maximum number T (Tmax) of OFDM symbols supported by the cell or monitored by the UE. In addition to this, ECCE to EREG mapping may be performed using EREGs existing in the same number Tmax of OFDM symbols. Alternatively, the EREG to RE mapping and ECCE to EREG mapping may be performed based on OFDM symbols included in the sPDCCH monitoring window. In the case, the value of Tmax may be equal to the sPDCCH monitoring window. For example, if the values of T for the sPDCCH are {1, 2, 4}, the EREG to RE mapping may be performed based on four OFDM symbols corresponding to the Tmax value.

As described above, ECCE resource mapping for the sPDCCH can be performed based on the Tmax OFDM symbol(s) or sPDCCH monitoring window. When the SPDCCH is transmitted only in T OFDM symbol(s) among the Tmax OFDM symbol(s) or in the sPDCCH monitoring window, the SPDCCH transmission may be rate-matched (or punctured) in an OFDM symbol(s) region except the T OFDM symbol(s) region where the SPDCCH is transmitted. For example, as shown in FIG. 15, when the sPDCCH monitoring window is composed of four OFDM symbols, the ECCE resource mapping is performed in each sPDCCH monitoring window. Since sPDCCH1 has T=2 and is transmitted using only the first and second OFDM symbols in the sPDCCH monitoring window thereof, the sPDCCH transmission may be rate-matched (or punctured) in a region consisting of the third and fourth OFDM symbols in the corresponding sPDCCH monitoring window. Similarly, since sPDCCH2 has T=2 and is transmitted using only the third and fourth OFDM symbols in the sPDCCH monitoring window thereof, the sPDCCH transmission may be rate-matched (or punctured) in a region consisting of the first and second OFDM symbols in the corresponding sPDCCH monitoring window. Further, since sPDCCH3 has T=1 and is transmitted using only the second OFDM symbol in the sPDCCH monitoring window thereof, the sPDCCH transmission may be rate-matched (or punctured) in a region consisting of the first, third and fourth OFDM symbols in the corresponding sPDCCH monitoring window.

Although the sPDCCH transmission is performed using the same AL, the actual amount of resources used for the sPDCCH transmission varies according to the value (size) of T used for the sPDCCH transmission. For example, in the case of the sPDCCH with T=4 OFDM symbols, the amount of resources used for the sPDCCH transmission is about two times greater than that used for transmitting the sPDCCH with T=2 OFDM symbols although the same AL is used. Therefore, to achieve the same range of effective code rates (or effective sPDCCH transmission resources) in transmitting the sPDCCH, the present invention proposes to change the range (or values) of the AL for the sPDCCH transmission according to the value of T. For example, assuming that the maximum value of T supported by the cell or monitored by the UE is Tmax and ALs that can be held by the sPDCCH transmitted with Tmax are {AL1, AL2, AL3, AL4}, ALs that can be held by the sPDCCH transmitted with T=Tmax/D may be set to {AL1*D, AL2*D, AL3*D, AL4*D}.

ECCE Resource Mapping Method 3

Figure 16:
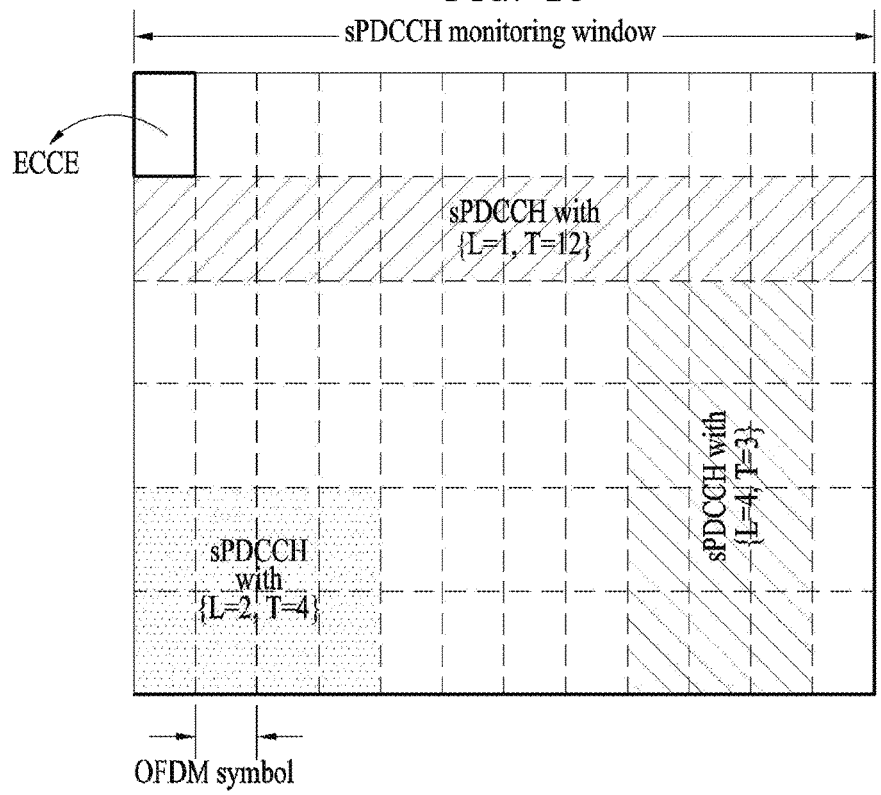
FIG. 16 illustrates another ECCE resource mapping method according to the present invention.

FIG. 16 illustrates another ECCE resource mapping method according to the present invention.

In order to support the plurality of sPDCCH transmission lengths T in the sPDCCH search space, the EREG to RE mapping may be performed based on the minimum number T (hereinafter referred to as Tmin) of OFDM symbols supported by the cell or monitored by the UE.

In addition to this, the ECCE to EREG mapping may be performed using EREGs existing in the same number Tmin of OFDM symbols. For example, when the values of T for the sPDCCH transmission are {2, 4, 12}, the EREG to RE mapping may be performed based on two OFDM symbols corresponding to the Tmin value. To support the plurality of sPDCCH transmission lengths T in the sPDCCH search space, the EREG to RE mapping and ECCE to EREG mapping may be performed based on a single OFDM symbol. That is, one ECCE may be composed of REs existing in the Tmin OFDM symbols or one OFDM symbol.

When the ECCE is composed of REs in one OFDM symbol, the sPDCCH with the AL value of L may be transmitted in T OFDM symbol(s) using L ECCEs in each OFDM symbol. The total number of ECCE resources used for the sPDCCH transmission is L*T. When the ECCE is composed of REs in two OFDM symbols, the sPDCCH is transmitted in the T OFDM symbol(s) using L ECCEs every two OFDM symbols, and the total number of ECCE resources used for the sPDCCH transmission is L*T/2.

Although the sPDCCH transmission is performed using the same AL, the actual amount of resources used for the sPDCCH transmission varies according to the value (size) of T used for the sPDCCH transmission. For example, in the case of the sPDCCH with T=4 OFDM symbols, the amount of resources used for the sPDCCH transmission is about two times greater than that used for transmitting the sPDCCH with T=2 OFDM symbols although the same AL is used. Therefore, to achieve the same range of effective code rates (or effective sPDCCH transmission resources) in transmitting the sPDCCH, the present invention proposes to change the range (or values) of the AL for the sPDCCH transmission according to the value of T. For example, assuming that the minimum value of T supported by the cell or monitored by the UE is Tmin and ALs that can be held by the sPDCCH transmitted with Tmin are {AL1, AL2, AL3, AL4}, ALs that can be held by the sPDCCH transmitted with T=Tmax/D may be set to {AL1/D, AL2/D, AL3/D, AL4/D}.

ECCE Resource Mapping Method 4

Figure 17:
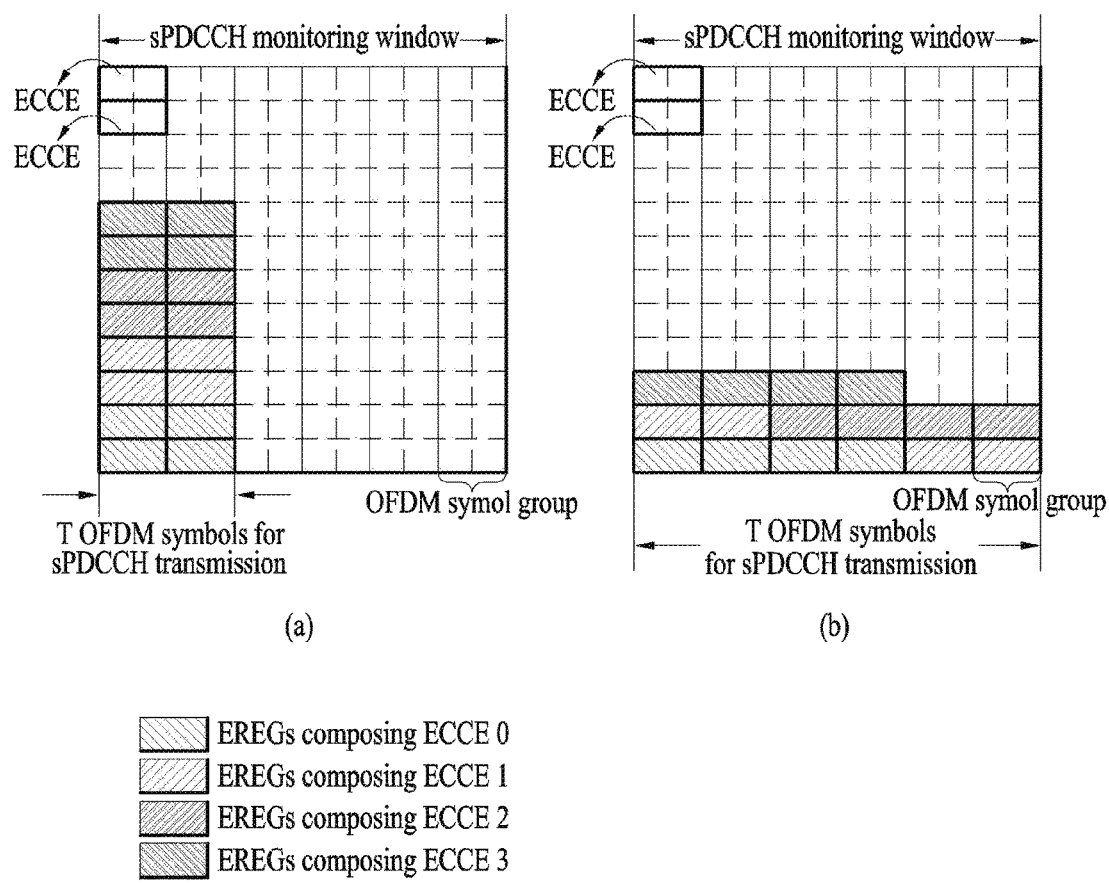
FIG. 17 illustrates still another ECCE resource mapping method according to the present invention.

FIG. 17 illustrates still another ECCE resource mapping method according to the present invention.

In order to support the plurality of sPDCCH transmission lengths T in the sPDCCH search space, the EREG to RE mapping may be performed based on the minimum number T (Tmin) of OFDM symbols supported by the cell or monitored by the UE. That is, one EREG may be composed of a plurality of REs existing the Tmin OFDM symbols.

For example, when the values of T for the sPDCCH transmission are {2, 4, 12}, the EREG to RE mapping may be performed in an OFDM symbol group consisting of two OFDM symbols corresponding to the Tmin value.

One ECCE may be defined using EREGs existing in several OFDM symbol groups. For example, when the sPDCCH monitoring window includes twelve OFDM symbols and it is divided into a total of six OFDM symbol groups, each of which consisting of two consecutive OFDM symbols, the EREG to RE mapping may be performed in one OFDM symbol group. On the other hand, in the case of the sPDCCH with the transmission length T, the ECCE to EREG mapping may be performed in T/2 OFDM symbol groups where T OFDM symbols for the sPDCCH transmission are present. That is, one ECCE is configured with a plurality of EREGs existing in the T/2 OFDM symbol groups where the sPDCCH is transmitted.

For example, as illustrated in FIG. 17, the sPDCCH monitoring window may be composed of twelve OFDM symbols, and one EREG is configured with resources in two consecutive OFDM symbols. In the case of the sPDCCH with the transmission length T=4 shown in FIG. 17 (*a*), one ECCE is configured using EREGs existing in a region consisting of four OFDM symbols in which the sPDCCH is transmitted. When one ECCE is composed of four EREGs, the one ECCE may include four EREGs among EREGs existing in the region configured with T=4 OFDM symbols where the sPDCCH is transmitted. The sPDCCH with L=4, which is transmitted in T=4 OFDM symbols, is transmitted via L=4 ECCEs, which are configured using the EREGs existing in the corresponding region configured with T=4 OFDM symbols. In the case of T=12, one ECCE is configured using EREGs exiting in a region consisting of twelve OFDM symbols where the sPDCCH is transmitted as shown in FIG. 17 (b). When one ECCE is composed of four EREGs, the one ECCE may include four EREGs among EREGs existing in the region configured with T=12 OFDM symbols where the sPDCCH is transmitted. The sPDCCH with L=4, which is transmitted in T=12 OFDM symbols, is transmitted via L=4 ECCEs, which are configured using the EREGs existing in the corresponding region configured with T=12 OFDM symbols.

Therefore, when this ECCE resource mapping method is used, the EREG to RE mapping is the same regardless of the value of T for the sPDCCH transmission, whereas the ECCE to EREG mapping varies according to the value of T for the sPDCCH transmission.

If the sPDCCH is transmitted on the same AL, the same amount of resources is used for the sPDCCH transmission although the value (size) of T used for the sPDCCH transmission is changed. Therefore, the AL used for the sPDCCH transmission can have the same range (or values) with respect to all values of T.

ECCE Resource Mapping Method 5

Figure 18:
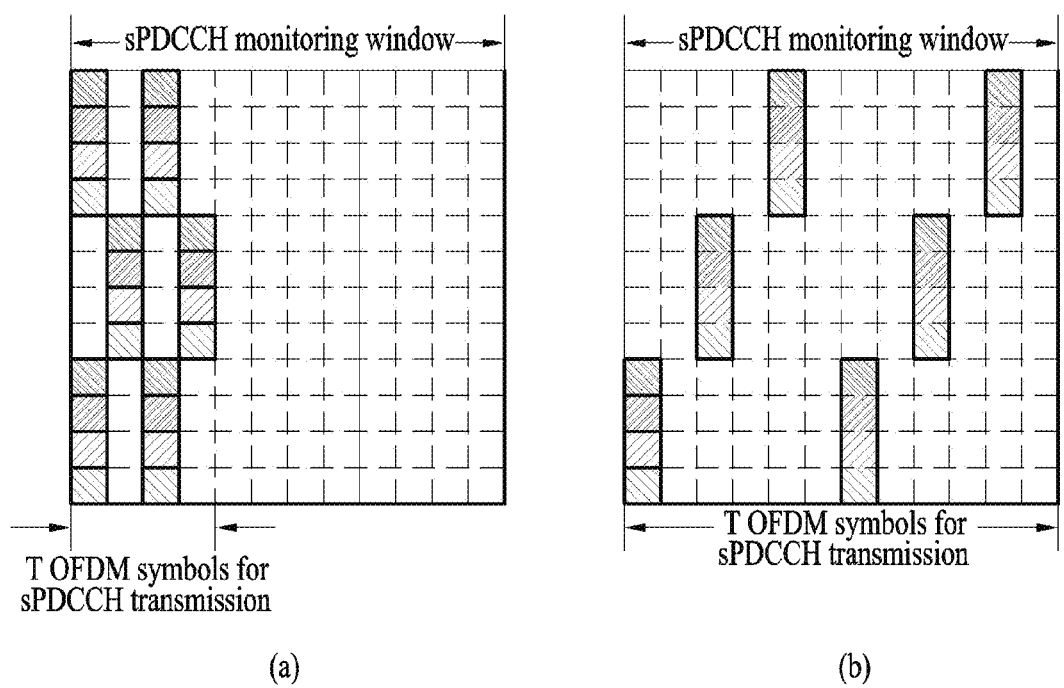
FIG. 18 illustrates a further ECCE resource mapping method according to the present invention.

FIG. 18 illustrates a further ECCE resource mapping method according to the present invention.

In order to support the plurality of sPDCCH transmission lengths T in the sPDCCH search space, the EREG to RE mapping and ECCE to EREG mapping may be performed based on the number (=T) of OFDM symbols where the sPDCCH is transmitted.

The EREG to RE mapping may be performed in the T OFDM symbols where the sPDCCH is transmitted. That is, in the case of the sPDCCH with the transmission length T, one EREG may be composed of a plurality of REs in the T OFDM symbols.

In addition, one ECCE may be defined using a plurality of EREGs existing in the T OFDM symbols where the sPDCCH is transmitted.

For example, as shown in FIG. 18 (a), in the case of the sPDCCH with the transmission length T=4, one EREG is configured using a plurality of REs among REs existing in a region configured with four OFDM symbols where the sPDCCH is transmitted. In addition, one ECCE is configured using a plurality of EREGs existing in the region configured with the four OFDM symbols used for the sPDCCH transmission. When one ECCE is composed of four EREGs, the one ECCE may include four EREGs among EREGs existing in the region configured with T=4 OFDM symbols where the sPDCCH is transmitted. The sPDCCH with L=4, which is transmitted in T=4 OFDM symbols, is transmitted via L=4 ECCEs, which are configured using the EREGs existing in the corresponding region configured with T=4 OFDM symbols. In the case of the sPDCCH with T=12, one EREG is configured using a plurality of REs among RES existing in a region composed of twelve OFDM symbols where the sPDCCH is transmitted, and one ECCE is configured using a plurality of EREGs exiting in the region consisting of twelve OFDM symbols where the sPDCCH is transmitted as shown in FIG. 18 (b). When one ECCE is composed of four EREGs, the one ECCE may include four EREGs among EREGs existing in the region configured with T=12 OFDM symbols where the sPDCCH is transmitted. The sPDCCH with L=4, which is transmitted in T=12 OFDM symbols, is transmitted via L=4 ECCEs, which are configured using the EREGs existing in the corresponding region configured with T=12 OFDM symbols.

When this ECCE resource mapping method is used, the EREG to RE mapping and ECCE to EREG mapping may vary according to the value of T for the sPDCCH transmission.

If the sPDCCH is transmitted on the same AL, the same amount of resources is used for the sPDCCH transmission although the value (size) of T used for the sPDCCH transmission is changed. Therefore, the AL used for the sPDCCH transmission (or values) with respect to all T values.

Figure 19:
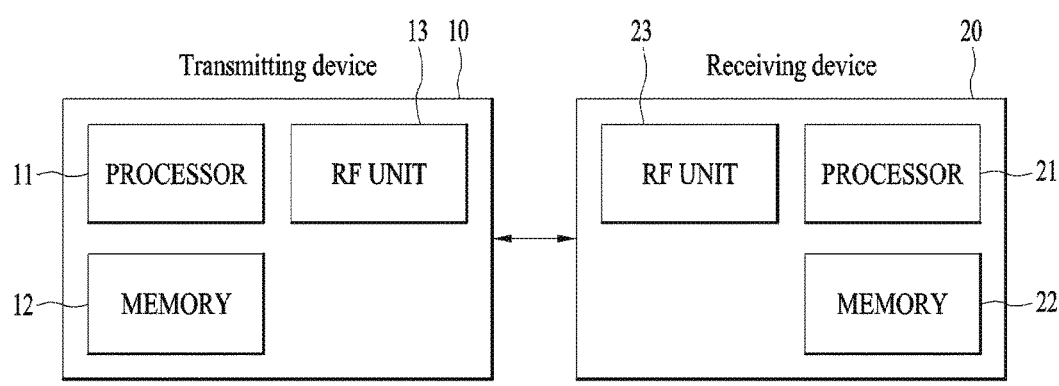
FIG. 19 is a block diagram illustrating elements of a transmitting device 10 and a receiving device 20 for implementing the present invention.

FIG. 19 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

According to the present invention, the eNB processor may control the eNB RF unit to transmit a PDCCH in a random number of OFDM symbols within the maximum time length Tmax capable of transmitting the PDCCH without informing the number of OFDM symbols occupied by the PDCCH.

Specifically, the eNB processor may control the eNB RF unit to transmit the PDCCH in a search space configured according to any one of the methods proposed in section A. The UE processor may control the eNB RF unit to receive the PDCCH in the search space configured according to any one of the methods proposed in section A. In addition, the UE processor may be configured to monitor decoding candidates over a random number of OFDM symbols and decode the PDCCH among the decoding candidates.

Each of the eNB processor and UE processor may be configured to map an EREG to REs and/or map an ECCE to EREGs according to any one of the methods proposed in section A.

The eNB processor may adjust the number of ECCEs based on the number of the OFDM symbols occupied by the PDCCH according to any one of the proposals of the present invention. The UE processor may monitor each decoding candidate according to any one of the proposals of the present invention by assuming that the number of occupied ECCEs varies according to the number of the OFDM symbols occupied by the PDCCH.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for receiving a downlink channel by a user equipment (UE) in a wireless communication system, the method comprising:
    receiving a downlink control channel carrying downlink control information within a transmission time interval (TTI); and
    receiving a downlink data channel based on the downlink control information,
    wherein receiving of the downlink control channel comprises monitoring a first downlink control channel candidate spanning T1 orthogonal frequency division multiplexing (OFDM) symbols within the TTI and monitoring a second downlink control channel candidate spanning T2 OFDM symbols within the TTI,
    wherein the downlink control channel comprises the first downlink control channel candidate or the second downlink control channel candidate, and
    wherein T1 is different from T2.

2. The method according to claim 1, wherein the TTI is equal to or smaller than 0.5 ms in a time domain.

3. The method according to claim 1, wherein the TTI is configured within a different TTI with a length of 1 ms in a time domain.

4. The method according to claim 1, wherein the first downlink control channel candidate occupies L1 control channel elements (CCEs), wherein the second downlink control channel candidate occupies L2 CCEs, and wherein L2=(T1/T2)*L1, where L1 and L2 are positive integers.

5. A method for transmitting a downlink channel by a base station (BS) in a wireless communication system, the method comprising:
    transmitting a downlink control channel carrying downlink control information within a transmission time interval (TTI); and
    transmitting a downlink data channel based on the downlink control information within the TTI,
    wherein transmitting the downlink control channel comprises transmitting the downlink control information through a first downlink control channel candidate spanning T1 orthogonal frequency division multiplexing (OFDM) symbols within the TTI or through a second downlink control channel candidate spanning T2 OFDM symbols within the TTI, and wherein T1 is different from T2.

6. The method according to claim 5, wherein the TTI is equal to or smaller than 0.5 ms in a time domain.

7. The method according to claim 5, wherein the TTI is configured within a different TTI with a length of 1 ms in a time domain.

8. The method according to claim 5, wherein the first downlink control channel candidate occupies L1 control channel elements (CCEs), wherein the second downlink control channel candidate occupies L2 CCEs, and wherein L2=(T1/T2)*L1, where L1 and L2 are positive integers.

9. A user equipment (UE) for receiving a downlink channel in a wireless communication system, the UE comprising:

a transceiver;

at least one processor; and at least one computer memory operably connectable to the at least one processor and storing instructions that, when executed by the at least one processor, perform operations comprising:

receiving, via the transceiver, a downlink control channel carrying downlink control information within a transmission time interval (TTI); and receiving, via the transceiver, a downlink data channel based on the downlink control information within the TTI, wherein the receiving the downlink control channel comprises monitoring a first downlink control channel candidate spanning T1 orthogonal frequency division multiplexing (OFDM) symbols within the TTI and monitoring a second downlink control channel candidate spanning T2 OFDM symbols within the TTI, wherein the downlink control channel comprises the first downlink control channel candidate or the second downlink control channel candidate, and wherein T1 is different from T2.

10. The UE according to claim 9, wherein the TTI is equal to or smaller than 0.5 ms in a time domain.

11. The UE according to claim 9, wherein the TTI is configured within a different TTI with a length of 1 ms in a time domain.

12. The UE according to claim 9, wherein the first downlink control channel candidate occupies L1 control channel elements (CCEs), wherein the second downlink control channel candidate occupies L2 CCEs, and wherein L2=(T1/T2)*L1, where L1 and L2 are positive integers.

13. A base station (BS) for transmitting a downlink channel in a wireless communication system, the BS comprising:

a transceiver;

at least one processor; and at least one computer memory operably connectable to the at least one processor and storing instructions that, when executed by the at least one processor, perform operations comprising:

transmitting, via the transceiver, a downlink control channel carrying downlink control information within a transmission time interval (TTI); and transmitting, via the transceiver, a downlink data channel based on the downlink control information, wherein the transmitting the downlink control channel comprises transmitting the downlink control information through a first downlink control channel candidate spanning T1 orthogonal frequency division multiplexing (OFDM) symbols within the TTI or through a second downlink control channel candidate spanning T2 OFDM symbols within the TTI, and wherein T1 is different from T2.

14. The BS according to claim 13, wherein the TTI is equal to or smaller than 0.5 ms in a time domain.

15. The BS according to claim 13, wherein the TTI is configured within a different TTI with a length of 1 ms in a time domain.

16. The BS according to claim 13, wherein the first downlink control channel candidate occupies L1 control channel elements (CCEs), wherein the second downlink control channel candidate occupies L2 CCEs, and wherein L2=(T1/T2)*L1, where L1 and L2 are positive integers.

* * * * *